No. 784,337. PATENTED MAR. 7, 1905.
C. LEIDY, P. V. JOHNSON & J. G. MARTIN.
CORN CUTTING MACHINE.
APPLICATION FILED MAR. 31, 1904.
2 SHEETS—SHEET 1.
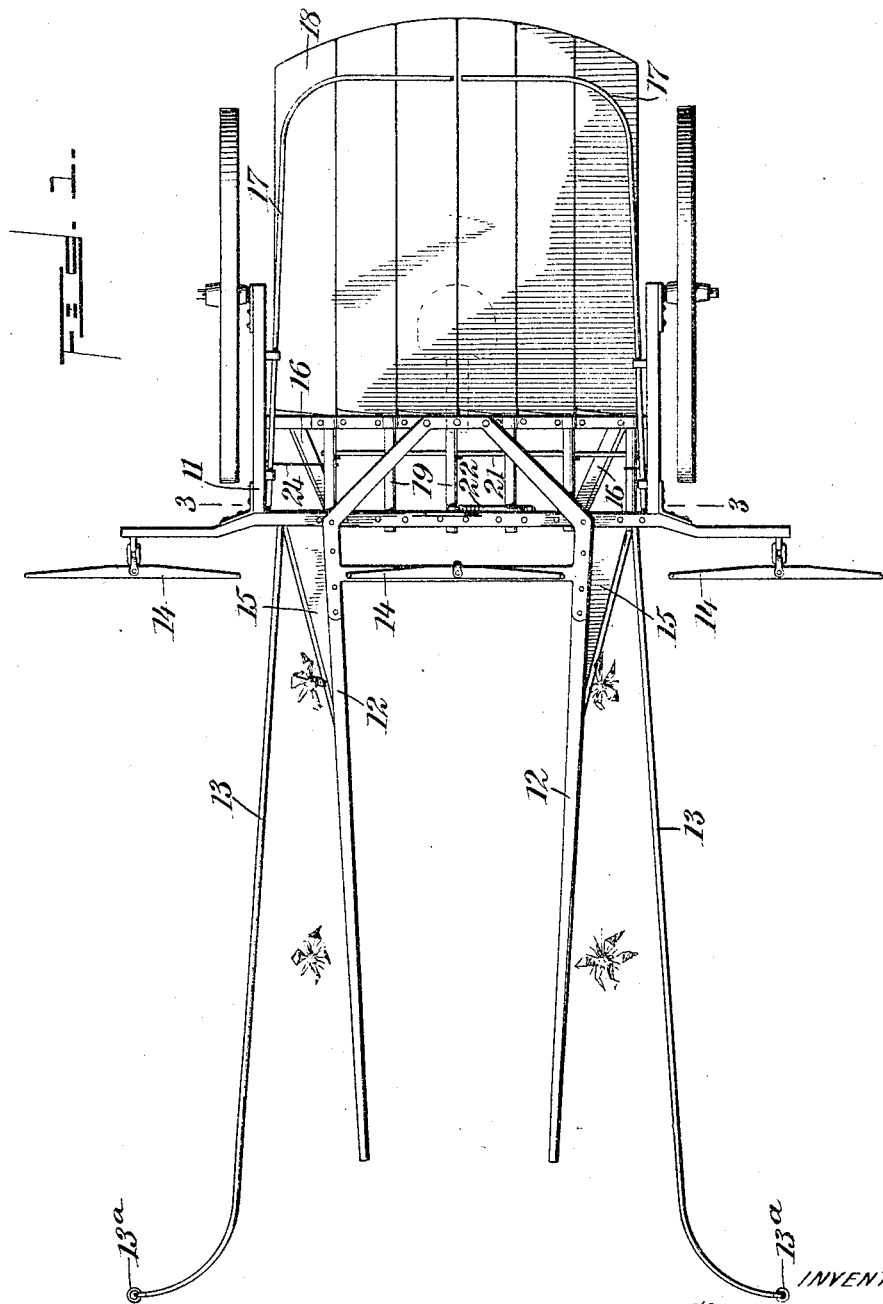
WITNESSES:
INVENTORS
Clement Leidy
Peter V. Johnson
Joseph G. Martin
BY
ATTORNEYS

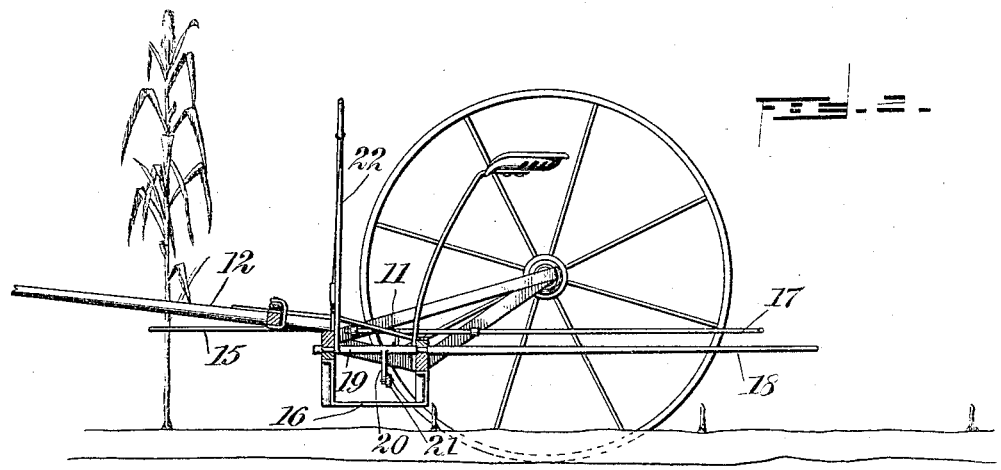
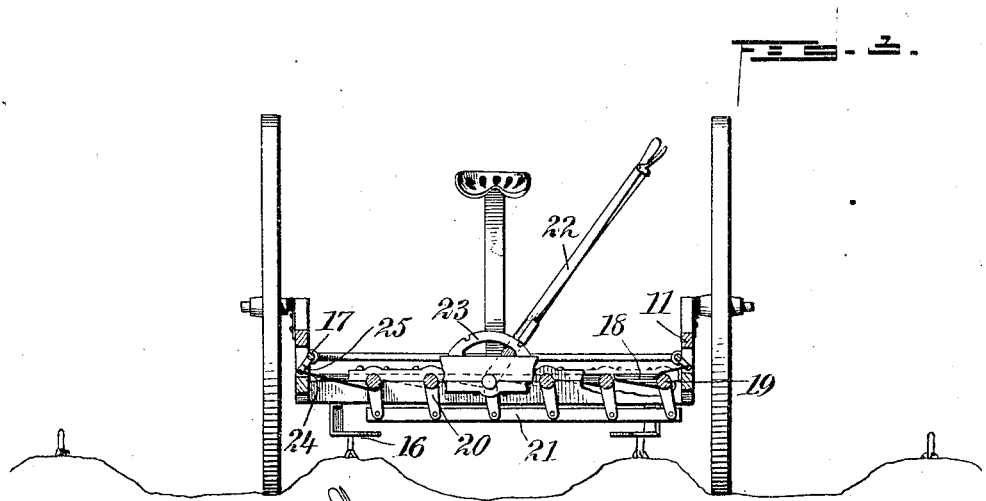
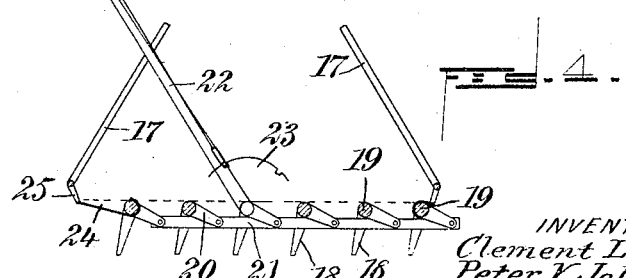

No. 784,337. Patented March 7, 1905.

UNITED STATES PATENT OFFICE.

CLEMENT LEIDY, PETER V. JOHNSON, AND JOSEPH G. MARTIN, OF FOSTORIA, OHIO.

CORN-CUTTING MACHINE.

SPECIFICATION forming part of Letters Patent No. 784,337, dated March 7, 1905.

Application filed March 31, 1904. Serial No. 200,904.

*To all whom it may concern:*

Be it known that we, CLEMENT LEIDY, PETER V. JOHNSON, and JOSEPH G. MARTIN, citizens of the United States, and residents of Fostoria, in the county of Seneca and State of Ohio, have invented a new and Improved Corn-Cutting Machine, of which the following is a full, clear, and exact description.

Our invention relates to harvesting-machines, and especially to that class of harvesting-machines used for cutting corn.

The principal objects of our invention are to provide a machine capable of being drawn by three horses and which will cut two rows of corn simultaneously, which will support a shock and afterward discharge it from the machine, and will cut the stubble.

Further objects will appear in the course of the subjoined description.

Reference is to be had to the accompanying drawings, forming a part of this specification, in which similar characters of reference indicate corresponding parts in all the figures.

Figure 1 is a plan view of a preferred form of our invention. Fig. 2 is a vertical central sectional view of the same. Fig. 3 is a sectional view on the line 3 3 of Fig. 1. Fig. 4 is a diagrammatic view showing the method of discharging the shock.

In the drawings, 11 represents the frame of the harvester, which may be formed in any desired way and is preferably supported by wheels. A pair of shafts 12 are rigidly secured to the frame. A pair of rods 13 are rigidly secured to the frame and extend beyond the ends of the shafts, where they are provided with eyes 13ª for the attachment of a rein or other guiding device. The object of these rods 13 is to provide for guiding horses upon the outside of the shafts, so that three horses may be used, the middle one only being driven from the machine. It will be obvious that the rods 13 may be attached to any part of the vehicle. Three whiffletrees 14 are employed in this construction.

The knives for cutting the corn are shown at 15 15 and are preferably attached to the frame in stationary positions immediately under the rear ends of the shafts. Underneath the frame and farther back than the knives 15 are located another pair of knives, 16, which are also firmly attached to the frame and are designed to cut the stubble left by the knives 15. The cutter is designed to be drawn along between the rows of corn in the manner shown in the figures and to cut two rows of corn at once. The corn on being cut is conveyed back upon the frame of the machine and is formed up into shocks by means of curved rods 17, being supported at the same time by a platform 18, which consists of a plurality of blades pivoted to shafts 19, which are journaled upon the framework. The corn remains in vertical position all the time.

Upon each shaft 19 is a lever 20, all of the levers extending in the same direction and being secured together at their ends by pivotal connections to a transverse rod 21, which is designed to be manipulated by means of a handle 22. The handle 22 is provided with the usual spring-key and rack 23 for the purpose of holding it in the desired position. Upon the two end shafts 19 are preferably wound flexible cords, belts, or chains 24, which are connected to levers 25, rigidly secured to the rods 17 beyond their pivotal points of suspension.

It will be seen that by the movement of the handle 22 from the position shown in Fig. 3, where the platform 18 and rods 17 are in the position shown in Fig. 1, to the position shown in Fig. 4 the platform 18 will be brought to the position shown in Fig. 4, which will permit the shock of corn to drop from it. At the same time the cords 24 will be wound up to some extent upon the end shafts, which will cause the rods 17 to be tilted upwardly upon their pivots in order to permit the shock to be released from the platform.

It will be seen that the difficulty of setting off the shock of corn onto the ground, which has always been experienced in corn-cutting machines, is entirely avoided by our invention. It will also be seen that a large amount of work can be done without any extra attention on the part of the driver, that it will not be necessary to touch the corn by hand at any point in the operation, and that the device is very simple and inexpensive to make and maintain.

It will be obvious that it is not necessary to follow the exact construction shown in the drawings, as many modifications may be made without departing from the spirit of our invention.

Having thus described our invention, we claim as new and desire to secure by Letters Patent—

1. A stalk-cutting machine, comprising a frame, a pair of shafts connected therewith, a platform composed of pivoted members adapted to support the stalks, means for discharging the stalks therefrom, guards extending along each side of the platform, each having an inwardly-extending portion for retaining stalks on the platform, each of said guards being pivoted at a plurality of points, means for oscillating the guards on their pivots in opposite directions, a stalk-cutter mounted on each shaft, and a stubble-cutter mounted on the frame in line with each of said stalk-cutters but in a lower plane.

2. A stalk-cutting machine, comprising a frame, a single pair of shafts rigidly connected thereto, a platform composed of pivoted members adapted to support the stalks, means for discharging the stalks therefrom, guards extending along each side of the platform, each having an inwardly-extending portion for retaining the stalks on the platform, each of said guards being pivoted at a plurality of points, means for oscillating the guards on their pivots in opposite directions, a stalk-cutter mounted on each shaft, and a stubble-cutter mounted on the frame in line with each of said stalk-cutters but in a lower plane, all of said cutters having outside cutting edges making acute angles with the central line of the frame.

3. A stalk-cutting machine, comprising a frame, a single pair of shafts rigidly connected thereto, a platform composed of pivoted members adapted to support the stalks, means for discharging the stalks therefrom, guards extending along each side of the platform each having an inwardly-extending portion for retaining the stalks on the platform, each of said guards being pivoted at a plurality of points, means for oscillating the guards on their pivots in opposite directions, a stalk-cutter mounted on each shaft, a stubble-cutter mounted on the frame in line with each of said stalk-cutters but in a lower plane, all of said cutters having outside cutting edges making acute angles with the central line of the frame, a plurality of whiffletrees, and a rod mounted at each side of the shafts, each rod having an eye located at a point beyond the ends of the shafts for guiding a horse at the side thereof.

In testimony whereof we have signed our names to this specification in the presence of two subscribing witnesses.

CLEMENT LEIDY.
PETER V. JOHNSON.
JOSEPH G. MARTIN.

Witnesses:
JOHN BENDER,
S. BENDER.